US011971257B2

(12) United States Patent
Jeon et al.

(10) Patent No.: US 11,971,257 B2
(45) Date of Patent: Apr. 30, 2024

(54) METHOD AND APPARATUS WITH LOCALIZATION

(71) Applicant: Samsung Electronics Co., Ltd, Suwon-si (KR)

(72) Inventors: Hyun Cheol Jeon, Suwon-si (KR); Chul Woo Kang, Suwon-si (KR); Kyungboo Jung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 126 days.

(21) Appl. No.: 17/232,235

(22) Filed: Apr. 16, 2021

(65) Prior Publication Data
US 2022/0155075 A1  May 19, 2022

(30) Foreign Application Priority Data
Nov. 19, 2020  (KR) .................. 10-2020-0155767

(51) Int. Cl.
G01C 21/00 (2006.01)
B60W 30/18 (2012.01)
(Continued)

(52) U.S. Cl.
CPC ..... *G01C 21/005* (2013.01); *B60W 30/18145* (2013.01); *B60W 30/18159* (2020.02); *B60W 40/02* (2013.01); *B60W 50/14* (2013.01); *G01C 19/00* (2013.01); *B60W 2420/42* (2013.01); *B60W 2520/06* (2013.01)

(58) Field of Classification Search
CPC ............. G01C 21/005; G01C 19/00; B60W 30/18159; B60W 30/18145; B60W 40/02; B60W 50/14; B60W 2420/42; B60W 2520/06
See application file for complete search history.

(56) References Cited

U.S. PATENT DOCUMENTS 9,494,942 B1    11/2016  Montemerlo et al.
9,720,412 B1 *   8/2017  Zhu ...................... G05D 1/0246
                         (Continued)

FOREIGN PATENT DOCUMENTS

JP   2014-109795 A    6/2014
JP   2019-67303 A     4/2019
(Continued)

OTHER PUBLICATIONS

Extended European Search Report dated Feb. 24, 2022 in counterpart European Patent Application No. 21192809.8 (9 pages in English).

Primary Examiner — Jaime Figueroa
Assistant Examiner — Mohamad O El Sayah
(74) Attorney, Agent, or Firm — NSIP Law

(57) ABSTRACT

Disclosed is a method and apparatus with localization. The method includes determining a sensor-based reference position using a position sensor of the vehicle, determining an image-based reference position of the vehicle based on image information of the vehicle captured using a camera of the vehicle, setting an acceptance range for the image-based reference position based on a driving situation of the vehicle, and comparing an error level of the image-based reference position to the acceptance range and estimating a current position of the vehicle.

28 Claims, 14 Drawing Sheets

(51) Int. Cl.
*B60W 40/02* (2006.01)
*B60W 50/14* (2020.01)
*G01C 19/00* (2013.01)

(56) References Cited

U.S. PATENT DOCUMENTS

| | | | |
|---|---|---|---|
| 2002/0177950 A1* | 11/2002 | Davies | G01C 21/30 |
| | | | 340/988 |
| 2016/0210860 A1* | 7/2016 | Belzner | G08G 1/147 |
| 2018/0095476 A1 | 4/2018 | Madsen et al. | |
| 2018/0172454 A1 | 6/2018 | Ghadiok et al. | |
| 2019/0113629 A1* | 4/2019 | Kang | G01S 19/08 |
| 2019/0186925 A1* | 6/2019 | Lee | G01C 21/30 |
| 2020/0116499 A1* | 4/2020 | Jung | G06T 7/70 |
| 2020/0160093 A1 | 5/2020 | Zaum et al. | |
| 2020/0192361 A1 | 6/2020 | Lambermont et al. | |
| 2020/0372263 A1* | 11/2020 | Song | G05D 1/0251 |
| 2021/0365694 A1* | 11/2021 | Lee | G06V 20/588 |
| 2022/0187095 A1* | 6/2022 | Lee | G01C 21/3644 |

FOREIGN PATENT DOCUMENTS

| | | |
|---|---|---|
| JP | 2020-21179 A | 2/2020 |
| KR | 10-2008-0099573 A | 11/2008 |
| KR | 10-1558285 B1 | 10/2015 |
| KR | 10-2018-0015018 A | 2/2018 |
| KR | 10-2069560 B1 | 1/2020 |
| KR | 10-2020-0042760 A | 4/2020 |
| KR | 10-2020-0065875 A | 6/2020 |

\* cited by examiner

METHOD AND APPARATUS WITH LOCALIZATION

CROSS-REFERENCE TO RELATED APPLICATIONS

This application claims the benefit under 35 USC § 119(a) of Korean Patent Application No. 10-2020-0155767, filed on Nov. 19, 2020, in the Korean Intellectual Property Office, the entire disclosure of which is incorporated herein by reference for all purposes.

BACKGROUND

1. Field

The following description relates to a method and apparatus with localization.

2. Description of Related Art

As an example, to assist driving of a vehicle and other transport methods, there is a navigation system that provides a variety of visual information to a driver through augmented reality (AR). The navigation system receives a global positioning system (GPS) signal from an artificial satellite through a GPS sensor and estimates a current position of the vehicle based on the received GPS signal. An absolute position value of the vehicle in latitude and longitude may be derived through the GPS signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes determining a first reference position based on position information of a vehicle measured using a position sensor of the vehicle, determining a second reference position of the vehicle based on image information of the vehicle captured using a camera of the vehicle, setting an acceptance range for the second reference position based on a driving situation of the vehicle, comparing the second reference position to the first reference position and estimating an error level of the second reference position, and comparing the error level of the second reference position to the acceptance range and estimating a current position of the vehicle.

The determining of the second reference position may include determining the second reference position based on geometric information of a lane boundary included in the image information.

The second reference position may include one or both of information on a lane to which the vehicle belongs, and information on a detailed position of the vehicle in the lane to which the vehicle belongs.

The setting of the acceptance range for the second reference position based on the driving situation of the vehicle may include determining the driving condition from among plural driving situations, where the plural driving situations may include at least one of a first driving situation in which the vehicle drives at an intersection, and a second driving situation in which the vehicle drives by turning a corner.

The setting of the acceptance range may include selectively adjusting a width of the acceptance range based on the driving situation.

The setting of the acceptance range may include setting an acceptance range for a second driving situation, in which the vehicle drives by turning a corner, to be wider than an acceptance range set for a first driving situation in which the vehicle drives at an intersection.

The estimating of the current position may include excluding consideration of the second reference position in the estimating of the current position of the vehicle in response to the error level of the second reference position being outside the acceptance range.

The estimating of the current position may include estimating the first reference position as the current position of the vehicle in response to the error level of the second reference position being outside the acceptance range, estimating a new position estimated based on a weighted sum of the second reference position and the first reference position as the current position of the vehicle in response to the error level of the second reference position being inside the acceptance range.

The determining of the error level may include determining the error level of the second reference position based on a distance between the second reference position and the first reference position.

The method may further include setting another acceptance range for another second reference position in a subsequent time step, including setting a width of the other acceptance range to be wider than a width of the acceptance range when the second reference position is outside of the acceptance range.

The method may further include determining a change in a reference heading angle corresponding to the second reference position based on a plurality of second reference positions corresponding to a plurality of previous time steps and the second reference position, where the estimating of the current position may include estimating the current position of the vehicle by further considering a comparison result between an output of a gyroscope and the determined change in the reference heading angle.

In one general aspect, one or more examples include a non-transitory computer-readable record medium storing instructions that, when executed by a processor, cause the processor to perform any one, any combination, or all operations, processes, and/or methods described herein.

In one general aspect, an apparatus includes one or more processors configured to determine a first reference position based on position information of a vehicle measured using a position sensor of the vehicle, determine a second reference position of the vehicle based on image information of the vehicle captured using a camera of the vehicle, set an acceptance range for the second reference position based on a driving situation of the vehicle, compare the second reference position to the first reference position and estimate an error level of the second reference position, and compare the error level of the second reference position to the acceptance range and estimate a current position of the vehicle.

For the estimation of the error level of the second reference position, the processor may be configured to determine the error level based on a distance between the second reference position and the first reference position.

For the estimation of the current position of the vehicle, the processor may be configured to estimate the first reference position as the current position of the vehicle in response to the error level of the second reference position being outside the acceptance range, and estimate a new position estimated based on a weighted sum of the second reference position and the first reference position as the current position of the vehicle in response to the error level of the second reference position being inside the acceptance range.

The apparatus may be a vehicle further including the camera, the sensor, and a control system configured to control the vehicle dependent on the current position.

For the setting of the acceptance range, the processor may be configured to set an acceptance range for a second driving situation, in which the vehicle drives by turning a corner, to be wider than an acceptance range set for a first driving situation in which the vehicle drives at an intersection.

The processor may be further configured to set another acceptance range for another second reference position in a subsequent time step, including setting a width of the other acceptance range to be wider than a width of the acceptance range when the second reference position is outside of the acceptance range.

The apparatus may further include a memory storing instructions, which when executed by the processor, configure the processor to perform the determining of the first reference position, the determining of the second reference position, the setting of the acceptance range, the comparing of the second reference position to the first reference position and estimate the error level, and comparing of the error level of the second reference position to the acceptance range and estimate the current position.

In one general aspect, an apparatus includes a processor configured to determine a first reference position based on position information of a vehicle measured using a position sensor of the vehicle, determine a second reference position of the vehicle based on image information of the vehicle captured using a camera of the vehicle, set an acceptance range for the second reference position based on a driving situation of the vehicle, compare the second reference position to the first reference position and estimate an error level of the second reference position, compare the error level of the second reference position to the acceptance range and estimate a current position of the vehicle, and generate a control instruction associated with driving of the vehicle based on the current position of the vehicle, and further includes a control system configured to control the vehicle in response to the control instruction.

The apparatus may be a vehicle and may further include the camera.

For the estimation of the error level of the second reference position, the processor may be configured to determine the error level based on a distance between the second reference position and the first reference position.

For the estimation of the current position of the vehicle, the processor may be configured to estimate the first reference position as the current position of the vehicle in response to the error level of the second reference position being outside the acceptance range, and estimate a new position estimated based on a weighted sum of the second reference position and the first reference position as the current position of the vehicle in response to the error level of the second reference position being inside the acceptance range.

In one general aspect, a processor-implemented method includes determining a first reference position based on position information of a vehicle measured using a position sensor of the vehicle, determining a second reference position of the vehicle based on image information of the vehicle captured using a camera of the vehicle, selecting, based on a determination of whether the second reference position is a faulty position, between estimating a current position of the vehicle based on the first reference position and the second reference position, and estimating the current position of the vehicle based on the first reference position, and estimating the current position based on a result of the selecting, where the determination of whether the second reference position is the faulty position is based on an error consideration for the second reference position that is dependent on a current driving situation of the vehicle.

The determination of whether the second reference position is the faulty position may be based on an acceptance range that is dependent on a determination of the current driving situation, and based on whether an estimated error of the second reference position is within the acceptance range.

The acceptance range may be set differently for at least two different driving situations, including the acceptance range being set to be wider in a turn corner situation than in an intersection situation.

The determination of whether the second reference position is the faulty position may include consideration of at least one or both of whether a previous time step determined second reference position was determined to be faulty, and a comparison between a determined change in reference heading angle corresponding to the second reference position and an output of a gyroscope of the vehicle.

Other features and aspects will be apparent from the following detailed description, the drawings, and the claims.

Figure 1:
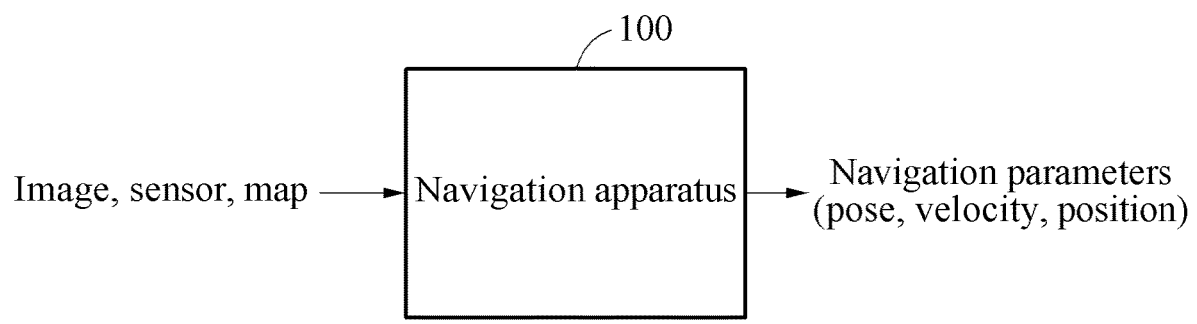
FIG. 1 illustrates an example of a navigation apparatus.

Throughout the drawings and the detailed description, unless otherwise described or provided, the same and like drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the present disclosure may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or other descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, operations, elements, components or a combination thereof, but do not preclude the presence or addition of one or more other features, integers, operations, elements, components, and/or groups thereof. In addition, the use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong consistent with and after an understanding of the present disclosure. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

Also, in the description of example embodiments, detailed description of structures or functions that are thereby known after an understanding of the disclosure of the present application may be omitted when it is deemed that such description may result in an ambiguous interpretation of the example embodiments.

Although terms of "first," "second," "A," "B," "(a)," "(b)," etc., are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It will be understood that when a component is referred to as being "connected to" or "coupled to" another component, the component can be directly connected or coupled to the other component or intervening components may be present.

Also, the term "vehicle" may refer to any type of transport devices and corresponding methods used to move a person or an object, e.g., with a driving engine, such as, for example, a car, a bus, a motorcycle, and a truck. The term "road" may refer to a road on which such vehicles, for example, travel and may include various types of roads, such as, for example, a highway, a national highway, a high-speed national highway, and an exclusive automobile road. The term "lane" represents a road space separated through lane boundaries marked on the road surface. The term "current driving lane", as a lane in which a vehicle is currently driving among a plurality of lanes, may refer to a lane space currently occupied and used by the vehicle and may also be referred to as an "ego lane." The term "lane boundary" represents a solid line or a dotted line marked on the road surface to distinguish a lane. The "lane boundary" may also be referred to as a "lane marking."

A component included in one example may be described using the same name in various examples. Unless the context clearly indicates otherwise, description made related to one example may apply to other examples and, thus, further description of the same may be omitted.

FIG. 1 illustrates an example of a navigation apparatus. Referring to FIG. 1, a navigation apparatus 100 may provide navigation parameters based on at least one of image data, sensor data, and map data of a vehicle. For example, the navigation parameters may include information on at least one of a pose, a velocity, and a position of the vehicle.

The vehicle may generate navigation information based on the navigation parameters and may provide the navigation information to a user, for example, a driver and/or the vehicle, for example, an autonomous vehicle. The navigation apparatus 100 may also be representative of the vehicle. As a non-limiting example, the vehicle may provide the navigation information using an augmented reality (AR) scheme through a three-dimensional (3D) head-up display (HUD) of the vehicle. The navigation apparatus 100 may represent a virtual image to be overlaid on a true background based on the navigation parameters. A state of the vehicle is desired to be accurately measured to implement or strive for an error-free AR environment.

The vehicle may include at least one camera configured to capture at least one direction among a plurality of directions around the vehicle including front, side, rear, upward, and downward. The navigation apparatus 100 may receive image information of the vehicle from the at least one camera. The vehicle may include a position sensor configured to measure a position of the vehicle, such as, for example, an inertial measurement unit (IMU), a global positioning system (GPS), and on board diagnostics (OBD). The navigation apparatus 100 may receive position information of the vehicle from the position sensor. Here, the IMU may include, as a non-limiting example, an acceleration sensor and a gyroscope.

The navigation apparatus 100 may use or generate a high definition (HD) map as map data. The HD map may include information on various map elements, for example, a lane boundary, a center line, and a guide marking, generated using various sensors. The various elements of the HD map may be represented as a point cloud and each point of the point cloud may correspond to a 3D position. The 3D position may be expressed in latitude, longitude, altitude, for example.

Figure 2:
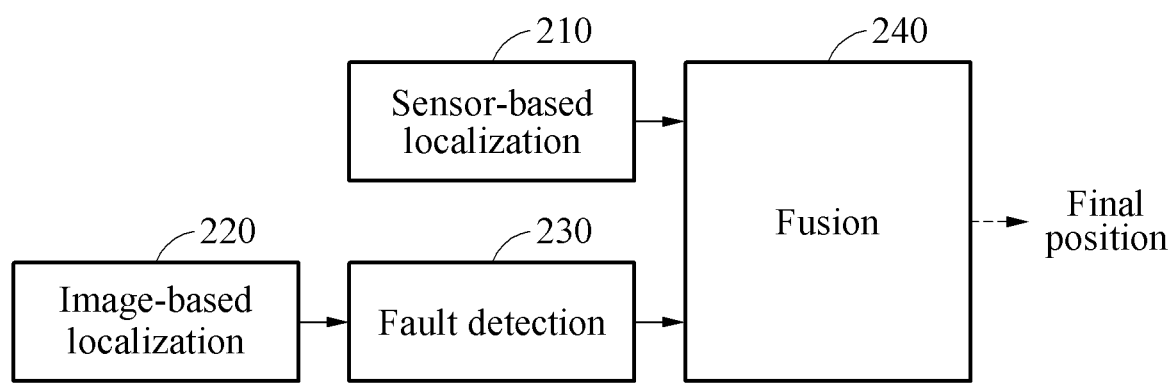
FIG. 2 illustrates an example of a position estimation process.

FIG. 2 illustrates an example of a position estimation process. Referring to FIG. 2, a navigation apparatus may perform sensor-based localization in operation 210, perform image-based localization in operation 220, and determine a final position of a vehicle by performing fusion based on results of operations 210 and 220 in operation 240.

In operation 210, the navigation apparatus may estimate a sensor-based position based on position information of a vehicle measured through a position sensor of the vehicle. The sensor-based localization may include sensor fusion, for example. The sensor fusion refers to an estimation scheme of fusing a variety of information. For example, the sensor fusion may correspond to a Kalman filter. In such an example, fused information may include a value estimated using an estimation model according to a Kalman filter theory and a value estimated using sensor information. For example, the navigation apparatus may use an IMU, a GPS, and OBD for the sensor fusion of operation 210. Here, the navigation apparatus may estimate a position, a velocity, and a pose of the vehicle using outputs of the GPS and the OBD as sensor information and outputs of the IMU as inputs to the estimation model.

In operation 220, the navigation apparatus may perform the image-based localization based on image information of the vehicle. The image information may include geometric information of a lane boundary visible in front of the vehicle. For example, the geometric information of the lane boundary may include information on at least one of a type, a direction, and an arrangement of lane boundaries. The navigation apparatus may determine an image-based position by combining other sensor information, excluding the image information, with the image information. For example, the navigation apparatus may verify an approximate position of the vehicle based on position information of the vehicle measured through a position sensor, such as a GPS sensor. The navigation apparatus may verify a lane to which the vehicle belongs and/or a detailed position of the vehicle in the lane to which the vehicle belongs based on the image information and estimate the image-based position accordingly. The estimated image-based position may be mapped to an HD map, and information of the HD map may be provided to a user, for example.

The sensor-based localization may be suitable for a fast output interval and may accurately apply a variance. Therefore, a relative position may be relatively accurately verified based on a position that is estimated based on a sensor. In an example, the image-based localization may be suitable to verify an absolute position. In operation 240, the navigation apparatus may derive a final position by performing fusion based on the sensor-based estimated position and the image-based estimated position estimated. Here, in an example, the navigation apparatus may perform fusion through the sensor fusion. For example, the navigation apparatus may estimate a final position of the vehicle using the image-based position of the vehicle estimated in operation 220 and the velocity of the vehicle estimated in operation 210, as inputs to a model for estimating the final position.

In general, an image may include some information that is suitable for estimating an absolute position. However, due to potential occlusions and saturations, some image information may be lost or a change, such as an increase or a decrease in lanes, may occur in a driving environment, which may lead to greatly degraded reliability of an estimated position that is estimated based on the image. Thus, deriving a final position based on the image-based estimated position may result in degraded accuracy of an estimated final position.

In various examples, the navigation apparatus may determine whether such an image-based estimated position corresponds to a fault, in operation 230, and may derive the final position by excluding the corresponding faulty position in operation 240 and may ultimately derive a final position with high accuracy.

In an example, the navigation apparatus may estimate an error level of a position that has been estimated based on an image, i.e., an image-based position, by setting an acceptance range based on a corresponding driving situation of the vehicle, and comparing the estimated error level of the image-based position to the acceptance range. The navigation apparatus may estimate the error level of the image-based position based on a sensor-based position, for example. When the error level is outside the acceptance range, the navigation apparatus may classify the image-based position as a fault. For example, the navigation apparatus may derive the final position by excluding consideration of the position estimated based on the image.

In another example, the navigation apparatus may calculate heading angles through image-based estimated positions in consecutive time steps and may compare changes in the calculated heading angles and outputs of one or more gyroscopes, for example. When a difference according to the comparison exceeds a threshold, for example, the navigation apparatus may classify a corresponding estimated position, for example, an estimated position of a last time step, as a fault.

The navigation apparatus may consider both an operation of considering whether an estimated error level is outside of an acceptance range and an operation of considering whether a difference according to comparisons of changes in calculated heading angles and outputs of one or more gyroscopes exceed a threshold. In such an example, the two operations may be performed sequentially or in parallel. When conditions of the two considerations are met, the image-based estimated position may be applied in a process of deriving a final position. Rather when the conditions of the two considerations are not met, the image-based estimated position may be considered a fault, and not utilized when deriving a final position.

Figure 3A:
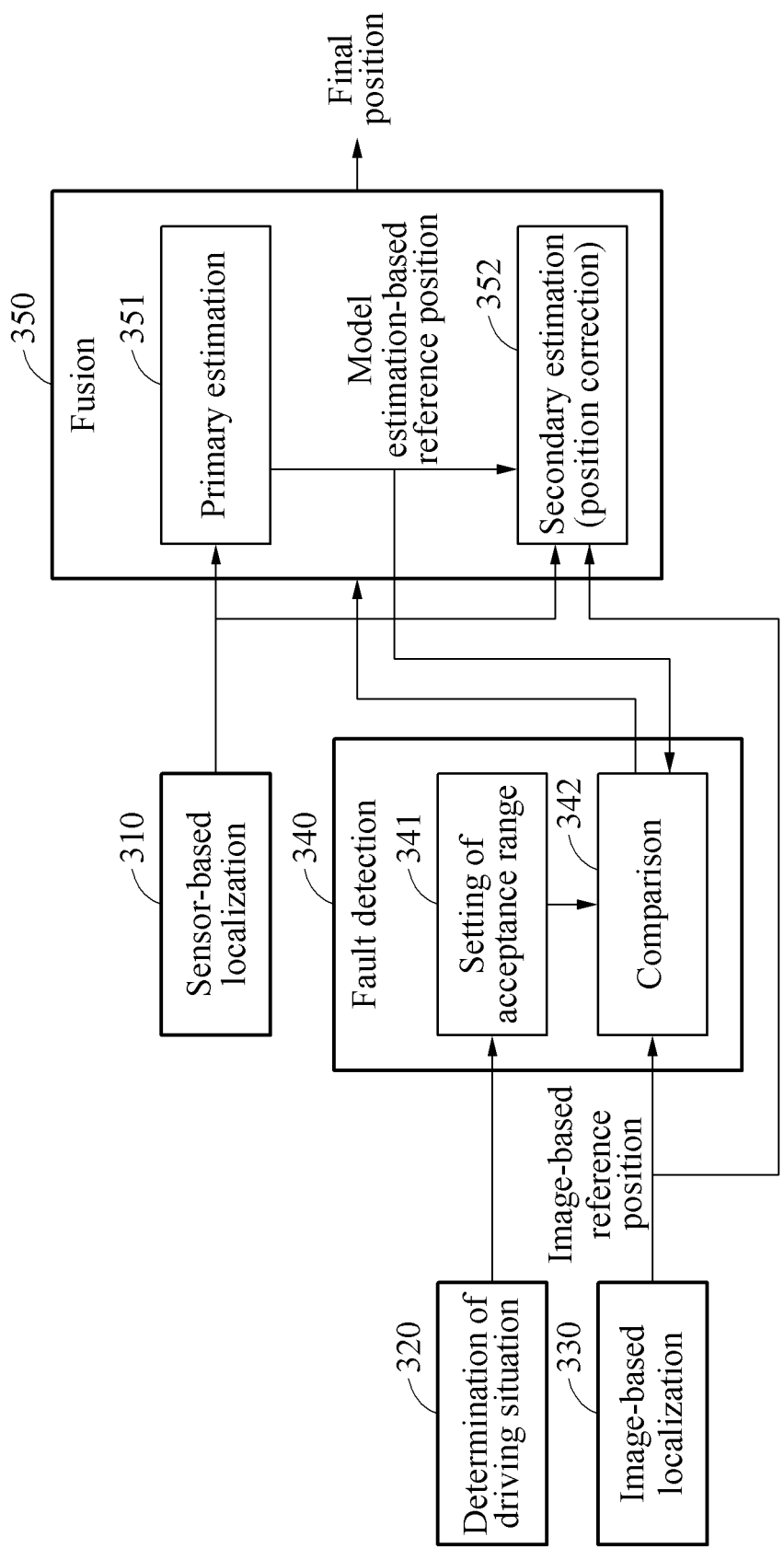
FIGS. 3A, 3B, and 3C illustrate examples of a process of estimating a position through a fault detection using an acceptance range.
Figure 3B:
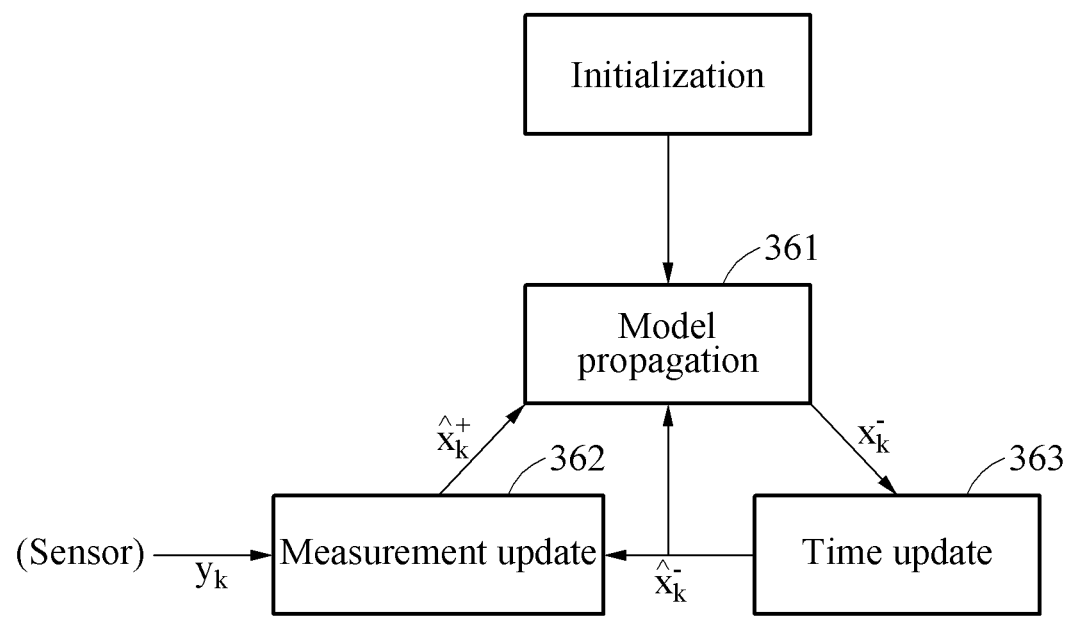
Figure 3C:
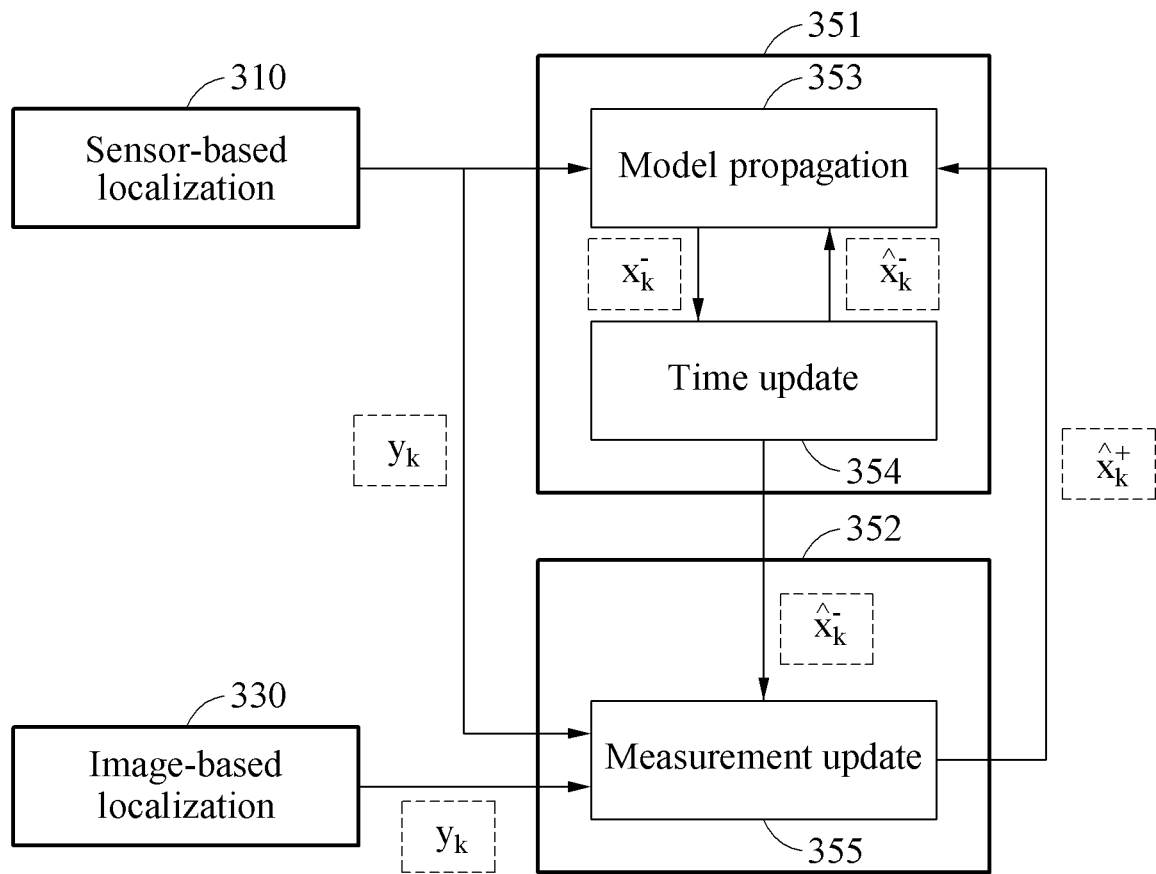

FIGS. 3A, 3B, and 3C illustrate examples of a process of estimating a position through a fault detection using an acceptance range. Referring to FIG. 3A, in operation 310, a navigation apparatus may perform sensor-based localization. The navigation apparatus may estimate a position, a velocity, and a pose, for example, of a vehicle based on sensor fusion. In operation 330, the navigation apparatus may perform image-based localization. The navigation apparatus may estimate a lane to which the vehicle belongs and/or a detailed position of the vehicle in the lane to which the vehicle belongs based on image information and sensor information. Here, the navigation apparatus may use the position and the pose of the vehicle estimated through sensor fusion in operation 310. An image-based localization result is based on the image information and thus, may be referred to as an image-based reference position.

In operation 320, the navigation apparatus may determine a driving situation of the vehicle. The driving situation of the vehicle may be determined based on a type of a driving road type and/or a driving direction type. For example, the driving situation may include a driving situation in which the vehicle drives at an intersection, a driving situation in which the vehicle drives by turning a corner, and other driving situations. Other driving situations may include a driving situation in which the vehicle drives straight ahead without turning at a section of the road not an intersection.

In operation 340, the navigation apparatus may perform a fault detection about the image-based reference position. For the fault detection, the navigation apparatus may set an acceptance range in operation 341 and may compare an estimated error level of the image-based reference position to the acceptance range in operation 342. The navigation apparatus may estimate the error level of the image-based reference position based on a sensor-based localization result. For example, the navigation apparatus may determine a model estimation-based reference position by performing a primary estimation of operation 351 based on the sensor-based localization result. The model estimation-based reference position may be used as a criterion to estimate the error level of the image-based reference position. An example primary estimation process is further described below. The navigation apparatus may estimate the error level of the image-based reference position based on a difference between the image-based reference position and the model estimation-based reference position. When the difference is relatively great or greater than a threshold, the error level of the image-based reference position may be determined to be relatively high.

The navigation apparatus may set the acceptance range based on the driving situation. In one example, the navigation apparatus may differently set a width or extent of the acceptance range based on the driving situation. Therefore, whether to accept image-based reference positions having the same error level may vary based on the driving situation. Said another way, while a particular large error level is estimated for each of several image-based reference positions, some of the image-based reference positions may be determined to be faults while some of the image-based reference positions may not be determined to be faults, depending on the driving situation of a particular image-based reference position. For example, a relatively small acceptance range may be set for driving at an intersection, while a relatively large acceptance range may be set for turn driving. In the case of driving at the intersection, there is a high probability that noise is included in image information due to, for example, disappearance of a lane, a change in a lane boundary pattern, and occurrence of occlusion leading up to and within the intersection. Therefore, a strict standard may be applied to the image-based reference position in the intersection situation. In the case of turn driving, the estimation accuracy in a lateral direction may significantly decrease. Therefore, accepting image information as much as possible may be advantageous in improving the accuracy of position estimation, and thus, the acceptance range for the turn driving may be greater than the acceptance range for the intersection situation. Example settings of the acceptance range is further described with reference to FIGS. 6 to 9. The navigation apparatus may classify an image-based reference position that is inside the acceptance range as no fault or as not being a fault, and may classify an image-based reference position that is outside the acceptance range as a fault.

In operation 350, the navigation apparatus may perform fusion based on the sensor-based localization result and the image-based localization result, that is, the image-based reference position. The fusion of operation 350 may include the primary estimation of operation 351 and secondary estimation of operation 352. The navigation apparatus may estimate a position of a current time step by performing the primary estimation using a final position estimated in a previous time step and the sensor-based localization result.

A primary estimation result corresponds to an estimation value of a model based on sensor information, for example, position data of the vehicle measured using a position sensor, such as a GPS, and may be referred to as the model estimation-based reference position to be distinguished from the image-based reference position. The navigation apparatus may also set the model estimation-based reference position based on the acceptance range.

The navigation apparatus may perform the secondary estimation by correcting the model estimation-based reference position based on the image-based reference position. The secondary estimation may be selectively performed based on a result of the fault detection performed in operation 340. When the image-based reference position corresponds to the fault, the secondary estimation may not be performed and the model estimation-based reference position may be output as a final position. When the image-based reference position corresponds to no fault, the secondary estimation may be performed and a new position according to a position correction result may be output as the final position. The new position may be estimated based on a weighted sum of the image-based reference position and the model estimation-based reference position. Hereinafter, as non-limiting examples, a fusion of operation 350 is further described with reference to FIGS. 3B and 3C.

FIG. 3B illustrates an example of sensor fusion. Referring to FIG. 3B, the sensor fusion may include model propagation in operation 361, measurement update in operation 362, and time update in operation 363. The model propagation refers to an operation of calculating information of a current time step from information of a previous time step ($\hat{x}_{k-1}^+$ or $\hat{x}_{k-1}^-$) based on a model. A calculation result may be represented as $x_k^-$. k denotes the current time step and +/− denotes whether sensor information is applied. When the measurement update is performed in the previous time step, information of the previous time step is $\hat{x}_{k-1}^+$. When the measurement update is not performed in the previous time step, information of the previous time step is $\hat{x}_{k-1}^-$.

The time update refers to an operation of performing "model-based estimation" on information of the current time step based on a Kalman filter theory, for example. An estimation result may be represented as $\hat{x}_k^-$. Here, the hat represents estimation. The measurement update refers to an operation of performing a weighted sum of $y_k$ and $\hat{x}_k^-$. $y_k$ denotes sensor information input in the current time step. A weight may be determined based on accuracy or covariance of $y_k$ and $\hat{x}_k^-$. A corresponding result may be represented as $\hat{x}_k^+$. When the measurement update is performed in response to input of $y_k$, an estimation result of the current time step $\hat{x}_k^+$. When the measurement update is not performed in response to no input of $y_k$, the estimation result of the current time step is $\hat{x}_k^-$. In a subsequent time step, the model propagation may be performed through $\hat{x}_k^+$ or $\hat{x}_k^-$.

FIG. 3C illustrates an example of a primary estimation, e.g., the primary estimation in operation 351 of FIG. 3A, and a sensor fusion, e.g., related to operation 352 of FIG. 3A. In operations 353, 354, and 355, the navigation apparatus of FIG. 3C may perform model propagation, measurement update, and time update corresponding to operations 361, 362, and 363, respectively. The navigation apparatus may calculate a position of a current time step by applying a velocity of the current time step estimated through the sensor-based localization to a position of a previous time step, as a model propagation operation. For example, $P_k$ may be calculated according to $P_k = P_{k-1} + V_k * \Delta t$. Here, $P_k$ denotes the position of the current time step, $P_{k-1}$ denotes the position of the previous time step, $V_k$ denotes the velocity of the current time step, and Δt denotes a time interval between consecutive two time steps. A calculation result corresponds to $x_k^-$.

The navigation apparatus may generate a primary estimation result through a time update operation. The primary estimation result corresponds to $\hat{x}_k^-$ and may be referred to as the aforementioned model estimation-based reference position. Also, the navigation apparatus may generate a secondary estimation result by performing a weighted sum of the sensor information and the primary estimation result. The secondary estimation result corresponds to $\hat{x}_k^+$. The sensor information may include the position of the current time step estimated through the sensor-based localization and the position of the current time step estimated through the image-based localization. As described above, the position of the current time step estimated through the image-based localization may be referred to as the image-based reference position. The navigation apparatus may generate the primary estimation result and the secondary estimation result through operations 353, 354, and 355, and select one of the primary estimation result and the secondary estimation result as a final position based on a fault detection result.

Figure 4A:
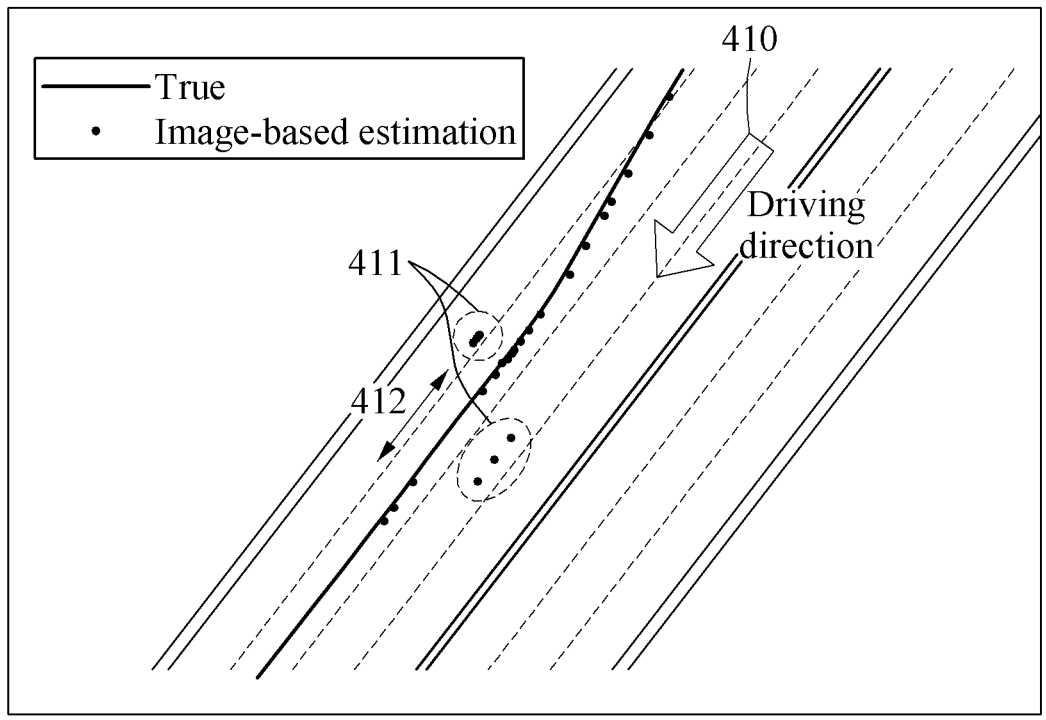
FIGS. 4A and 4B illustrate examples of a fault of an image-based reference position.
Figure 4B:
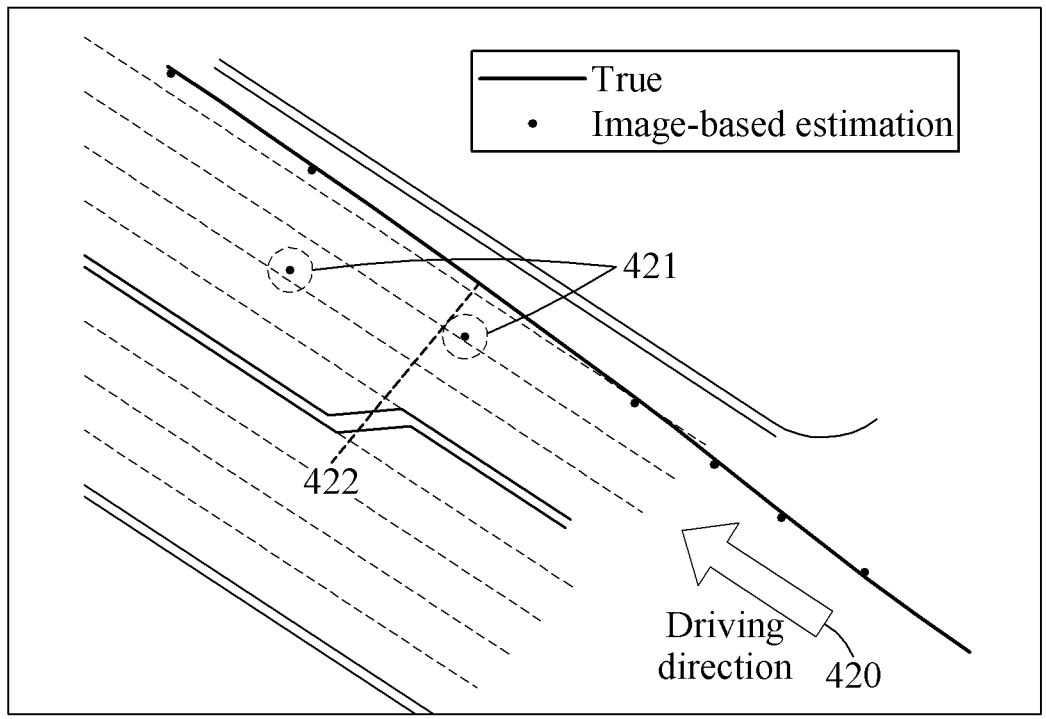

FIGS. 4A and 4B illustrate examples of a fault of an image-based reference position. In FIGS. 4A and 4B, the heavy or dark solid line represents a true or actual driving route and the points represent positions estimated based on an image. FIG. 4A illustrates an example in which a current vehicle drives in a direction according to an indicator 410 with an arrowhead and occlusion occurs in a section 412. For example, when another vehicle in front of the current obscures a camera of the current vehicle, occlusion may occur. As the occlusion occurs in the section 412, it is difficult to include information suitable for determining an absolute position in image information captured in the section 412. Therefore, positions 411 may differ from the true driving route.

FIG. 4B illustrates an example in which a current vehicle drives in a direction according to an indicator 420 with an arrowhead and the number of lanes increase at a boundary 422. If all of the lanes appear in image information, the lane that is the driving lane of the vehicle may be relatively easily identified. However, if not all of the lanes, but only a portion of all of the lanes, appear in the image information, for example, if only two lanes are captured on a four-lane road, it may be difficult to identify the lane corresponding to the driving lane of the current vehicle. In this situation, if the number of lanes increase or decrease, the accuracy of position information may be further degraded. For example, if a left-turn lane boundary appears in a first lane, a change of a driving lane may be required, such as changing the driving lane from a second lane to a third lane. However, information on such increases or decreases in the number of lanes may not be immediately reflected in position information through the image information. Therefore, although the vehicle drives in the same lane, a fault may occur in image-based localization and the driving lane may be recognized to have been changed as in positions 421.

Referring to the positions 411 of FIG. 4A and the positions 421 of FIG. 4B, a fault by image-based localization is highly likely to involve a lane jump that is erroneously recognized as a change in the driving lane. An image-based localization result is provided by being mapped on an HD map. Here, the HD map includes position information of each lane boundary and the localization result may be generally mapped on the HD map based on such lane boundaries. Also, in a situation, such as occlusion and lane increases/decreases, image information may include information for estimating a detailed position in a current driving lane, however, the image information is highly likely to not include information for estimating which numbered lane is the current driving lane among all of the lanes. Therefore, the navigation apparatus may detect a fault in positions estimated through image-based localization, based on such lane jump.

Figure 5:
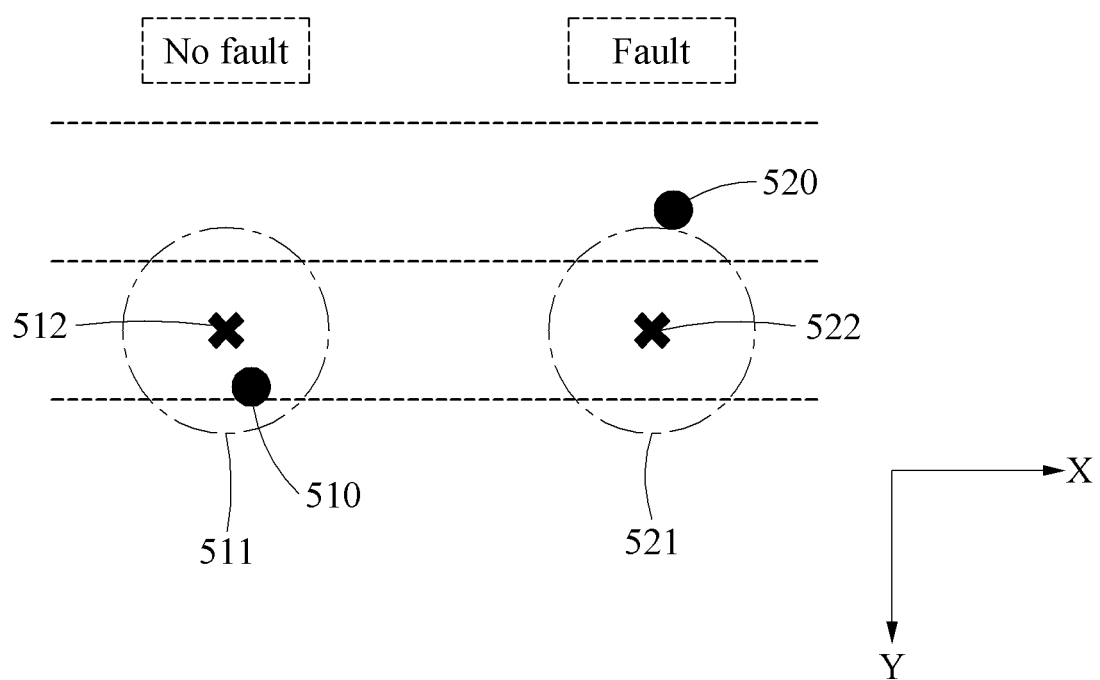
FIG. 5 illustrates an example of a comparison between a reference position and an acceptance range.

FIG. 5 illustrates an example of a comparison between a reference position and an acceptance range. FIG. 5 illustrates a first acceptance region 511 about a first image-based reference position 510 and a second acceptance region 521 about a second image-based reference position 520. Each acceptance region visually represents each corresponding acceptance range to help understanding of each acceptance range.

Referring to FIG. 5, the first acceptance region 511 corresponds to a circle with a radius of a first acceptance range set for the first image-based reference position 510 and a center of the first acceptance region 511 is a first model estimation-based reference position 512 corresponding to the first image-based reference position 510. Likewise, the second acceptance region 521 corresponds to a circle with a radius of a second acceptance range set for the second image-based reference position 520 and a center of the second acceptance region 521 is a second model estimation-based reference position 522 corresponding to the second image-based reference position 520. Therefore, an image-based reference position that is inside an acceptance region may represent that a difference between the image-based reference position and a model estimation-based reference position corresponding thereto is inside the acceptance range. In FIG. 5, it is assumed that the first acceptance range and the second acceptance range are the same. For example, each acceptance range may have a width based on a width of each lane.

The navigation apparatus may determine a distance between the first image-based reference position 510 and the first model estimation-based reference position 512 as an error level of the first image-based reference position 510 and may determine a distance between the second image-based reference position 520 and the second model estimation-based reference position 522 as an error level of the second image-based reference position 520. Also, the navigation apparatus may compare the error level of the first image-based reference position 510 to the first acceptance range and compare the error level of the second image-based reference position 520 to the second acceptance range. Here, since the first image-based reference position 510 is inside the first acceptance region 511, the navigation apparatus may classify the first image-based reference position 510 as no fault. Since the second image-based reference position 520 is outside the second acceptance region 521, the navigation apparatus may classify the second image-based reference position 520 as a fault.

The accuracy of a lateral direction (Y) may be more important than the accuracy of a longitudinal direction (X) in driving of the vehicle. Therefore, the navigation apparatus may determine an error level of each image-based reference position based on the lateral direction (Y). For example, the navigation apparatus may determine the error level of the first image-based reference position 510 based on a difference between an y coordinate of the first image-based reference position 510 and an y coordinate of the first model estimation-based reference position 512 according to a coordinate system of FIG. 5, and may set an acceptance range corresponding thereto and compare the acceptance range to the error level.

Figure 6:
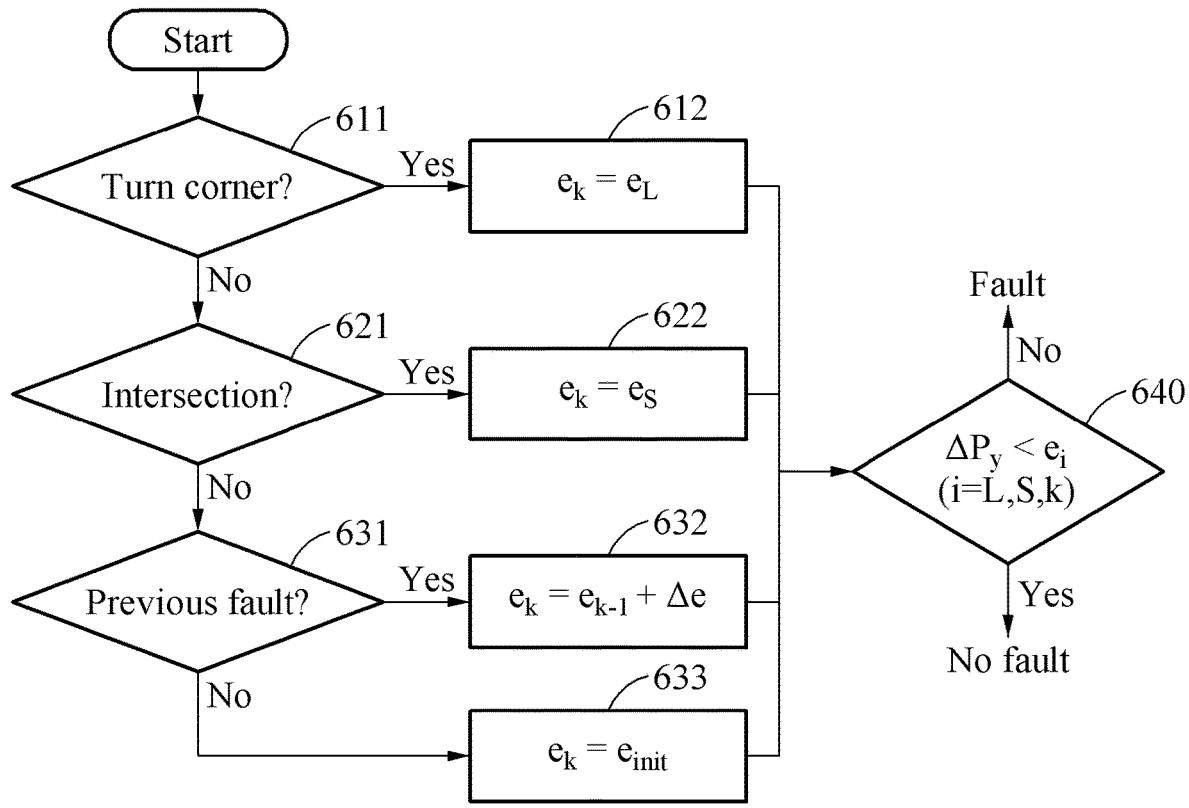
FIG. 6 illustrates an example of setting an acceptance range based on a driving situation.

FIG. 6 illustrates an example of setting an acceptance range based on a driving situation. Referring to FIG. 6, the navigation apparatus may determine a current driving situation in operations 611, 621, and 631, and may set an acceptance range based on the current driving situation in operations 612, 622, 632, and 633. In operations 612, 622, 632, and 633, $e_k$ denotes an acceptance range of a current time step, $e_L$ denotes a first acceptance range, and $e_s$ denotes a second acceptance range. Compared to $e_s$, $e_L$ may correspond to a wider acceptance range. For example, when the current driving situation corresponds to turning a corner, the navigation apparatus may set the current acceptance range as $e_L$. When the current driving situation corresponds to driving at an intersection, the navigation apparatus may set the current acceptance range as $e_s$.

Although the current driving does not correspond to both turning a corner and driving at an intersection, the navigation apparatus may adjust the width of the acceptance range depending on whether a previous image-based reference position is classified as a fault. For example, when the previous image-based reference position is classified as the fault, the navigation apparatus may increase a width of $e_k$ by $\Delta e$ compared to $e_{k-1}$. When the previous image-based reference position is classified as no fault, the navigation apparatus may set $e_k$ as $e_{init}$. Here, $e_{init}$ denotes an initial width, and, for example, may have a value based on a lane width. If the fault persists and an image-based reference position is continuously excluded from the position estimation, the fault may diverge. Therefore, if the fault persists, the navigation apparatus may increase the width of the acceptance range incrementally, e.g., little by little, to prevent divergence of the fault.

In operation 640, the navigation apparatus may compare $\Delta P_y$ and $e_i$. $\Delta P_y$ denotes a difference between an image-based reference position and a model estimation-based reference position. If the difference is large, an error level of the image-based reference position may be regarded to be high. For example, $\Delta P_y$ may represent a difference in a lateral direction between the image-based reference position and the model estimation-based reference position. $e_i$ denotes a set acceptance range, and i may correspond to one of L, S, and k, i.e., depending of the results of operations 611, 621, or 631. For example, if $\Delta P_y$ is inside the acceptance range, for example, if $\Delta P_y$ is less than $e_i$, the navigation apparatus may classify the corresponding image-based reference position as no fault. If $\Delta P_y$ is outside the acceptance range, for example, if $\Delta P_y$ is greater than $e_i$, the navigation apparatus may classify the corresponding image-based reference position as a fault.

Figure 7:
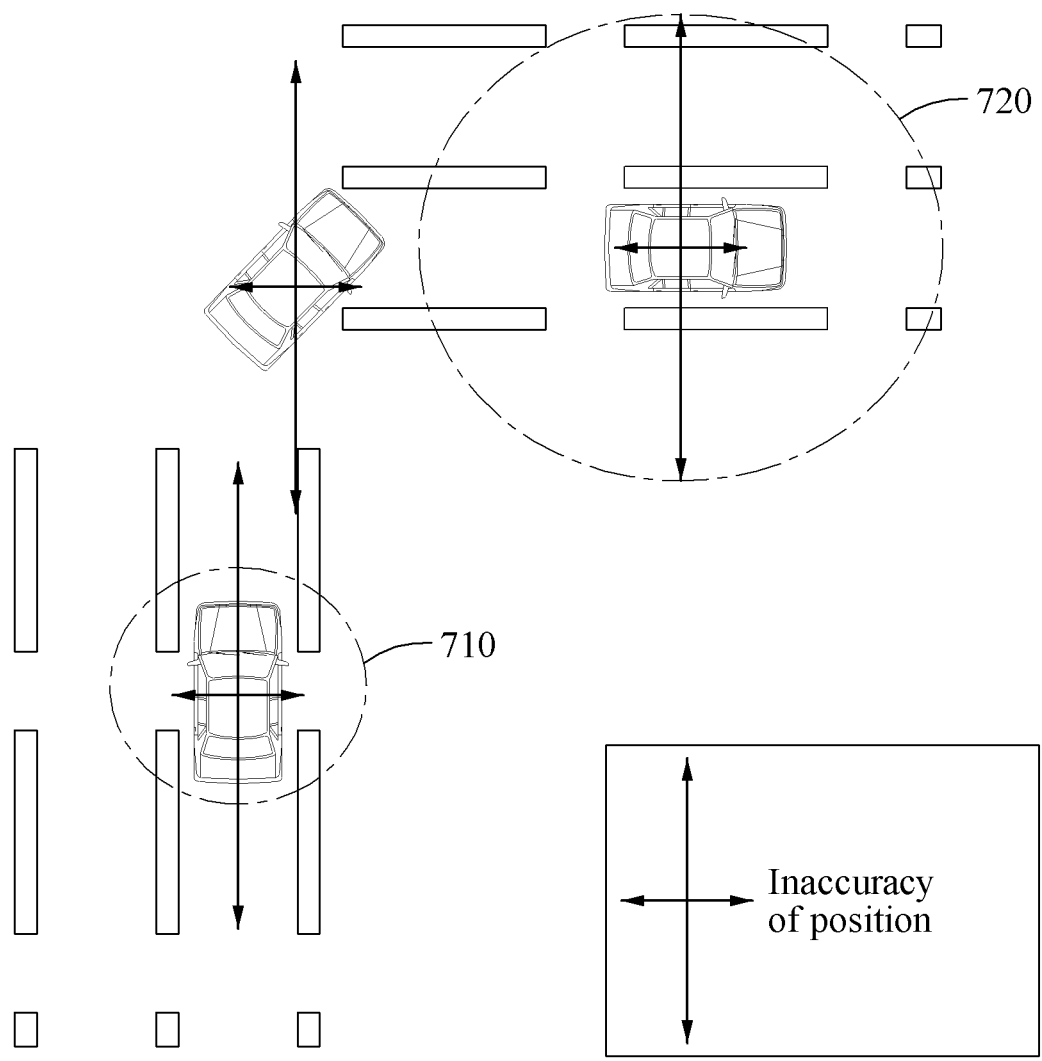
FIG. 7 illustrates an example of detecting a turn situation.

FIG. 7 illustrates an example of detecting a turn situation. Since road related information is generally distributed in a lateral direction, estimation in a longitudinal direction tends to be inaccurate compared to estimation in the lateral direction. If a vehicle turns in a corner section, inaccuracy in the longitudinal direction may affect the estimation in the lateral direction for a predetermined (or, alternatively, desired) period of time before and after the turn. Inaccuracy in the lateral direction may have fatal consequences, such as, for example, estimating that the vehicle is off the roadway or is present in a wrong lane. Therefore, the inaccuracy in the lateral direction needs to be urgently corrected.

To decrease the inaccuracy in the lateral direction, the navigation apparatus may increase a width of an acceptance range based on image information. Referring to FIG. 7, it can be seen that an acceptance range 720 after the vehicle turns is wider than an acceptance range 710 before the vehicle turns. Therefore, although an error level of an image-based reference position may be slightly higher after the turn, there is a greater probability that the image-based reference position may be used to estimate a final position. The navigation apparatus may accumulate output of a gyroscope, for example, for a predetermined (or, alternatively, desired) period of time and, if an angle accumulated for the period of time exceeds a threshold, may determine that a driving situation corresponds to a turn driving. If the accumulated angle falls below the threshold, the navigation apparatus may determine that the turn is over and, from this point in time, may expand the acceptance range to converge a lateral position of the vehicle to the image-based reference position.

Figure 8:
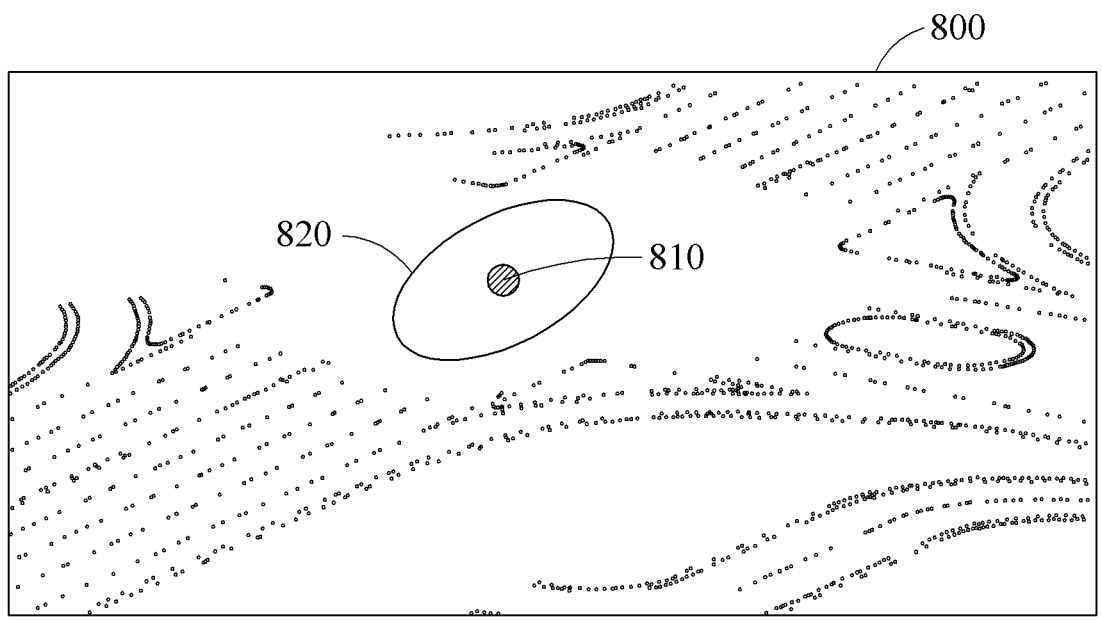
FIG. 8 illustrates an example of detecting driving at an intersection.

FIG. 8 illustrates an example of detecting driving at an intersection. Referring to 8, a current estimated position 810 of a vehicle is marked on an HD map 800. Each point on the HD map 800 may include information on various map elements, for example, a lane boundary, a center line, and a guide sign. Therefore, a map element present around the current estimated position 810 may be verified through points on the HD map 800. The navigation apparatus may verify whether a lane is present in a surrounding region 820 of the current estimated position 810 and, when the lane is absent, may determine that the current estimated position 810 corresponds to an intersection. An image-based localization algorithm that recognizes a road environment may determine that a fault occurrence probability is high in an intersection section in which a lane disappears or a new lane appears. The navigation apparatus may decrease a width of an acceptance range for a predetermined (or, alternatively, desired) period of time after passing the intersection to minimize a position estimation error at the intersection.

Figure 9:
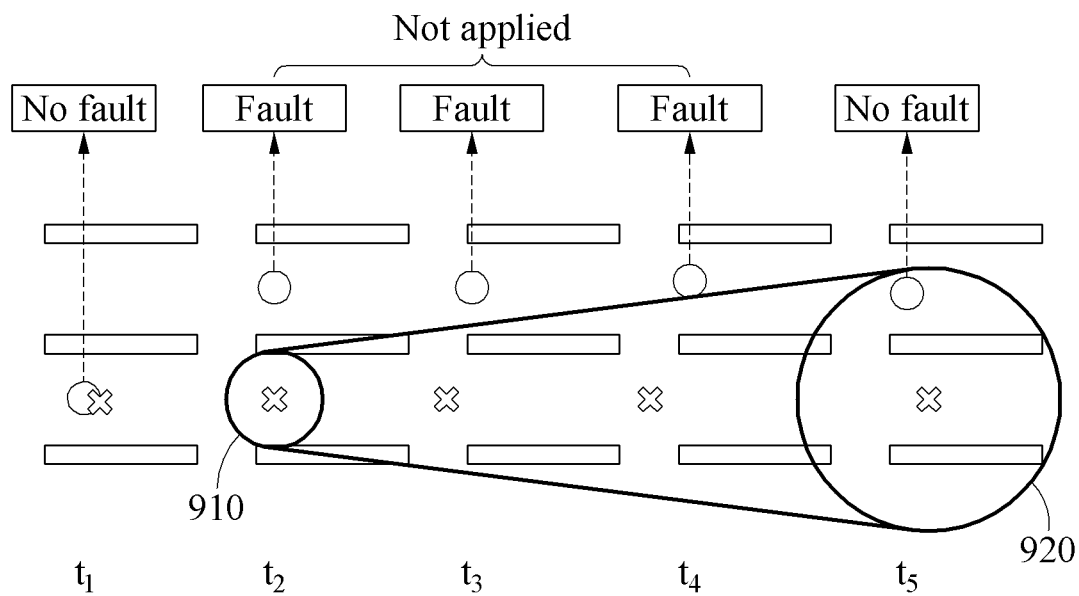
FIG. 9 illustrates an example of expanding an acceptance range.

FIG. 9 illustrates an example of expanding an acceptance range. Referring to FIG. 9, an image-based reference position starts to deviate from an acceptance region 910 in a time step $t_2$ and this state is maintained until a time step $t_4$. Therefore image-based reference positions from the time steps $t_2$ to $t_4$ may not be applied in estimating a final position. If the image-based reference position is continuously ignored in a situation in which faults persist, the fault may become diverged, and the estimation accuracy may be further degraded than using the image-based reference position. Therefore, if a fault persists, the navigation apparatus may increase a width of the acceptance range incrementally, e.g., little by little, to prevent the divergence of the fault. The navigation apparatus may expand the acceptance region 910 from the time step $t_2$ in which the image-based reference position starts to deviate from the acceptance region 910. In a time step $t_5$, the image-based reference position enters an acceptance region 920. Therefore, the navigation apparatus may use the image-based reference position to estimate the final position from the time step $t_5$.

Figure 10:
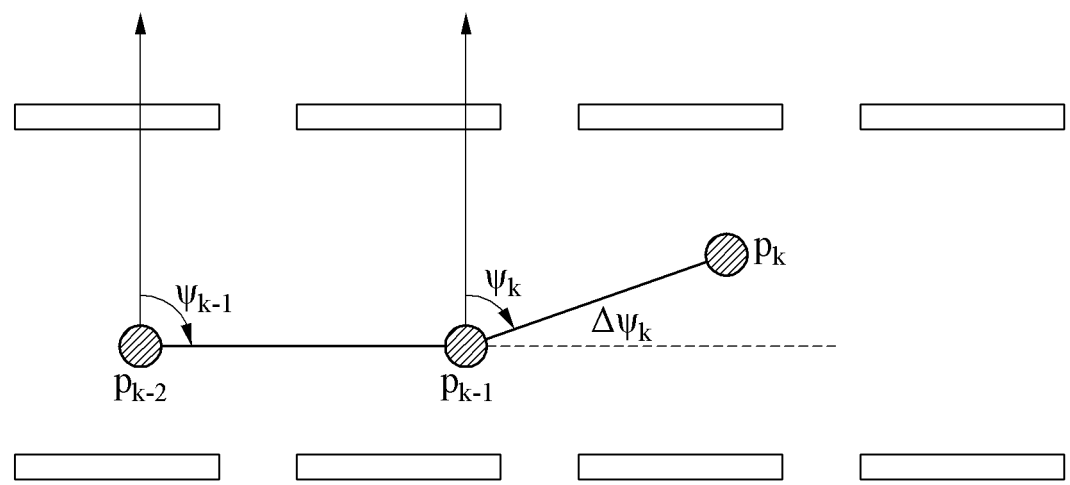
FIG. 10 illustrates an example of a process of detecting a fault using a heading angle.

FIG. 10 illustrates an example of a process of detecting a fault using a heading angle. The navigation apparatus may classify an image-based reference position through other processes alternatively or in addition to the aforementioned process of using an error level and an acceptance range. FIG. 10 illustrates an example of a process using a heading angle as one of such other processes.

The navigation apparatus may determine a change in a reference heading angle corresponding to an image-based reference position of a current time step based on a plurality of image-based reference positions corresponding to a plurality of time steps including the current time step. The navigation apparatus may compare the change in the reference heading angle to an output of a gyroscope and may perform a fault detection about the image-based reference position of the current time step. If a difference according to the comparison is greater than a threshold, the navigation apparatus may classify the corresponding image-based reference position as a fault. If the difference is less than the threshold, the navigation apparatus may classify the corresponding image-based reference position as no fault. If the error level is inside the acceptance range and a difference of a heading angle is less than the threshold, that is, if both valid conditions are met, the navigation apparatus may classify the image-based reference position as no fault and may use the same to estimate a current position.

Referring to FIG. 10, image-based reference positions $p_{k-2}$ to $p_k$ of three consecutive time steps k-2 to k are illustrated. Here, an average heading angle may be calculated according to the below Equation 1, for example.

$$\psi_k = \tan^{-1} \frac{l_k - l_{k-1}}{L_k - L_{k-1}} \qquad \text{Equation 1}$$

In Equation 1, $L_k$ denotes latitude of a current time step, $l_k$ denotes longitude of the current time step, $L_{k-1}$ denotes latitude of a previous time step, and $l_{k-1}$ denotes longitude of the previous time step. Latitude and longitude may be known from coordinates of the image-based reference positions $p_{k-2}$ to $p_k$. The average heading angle $\psi k$ between the current time step and the previous time step may be calculated according to Equation 1. When at least three time steps are given as illustrated in FIG. 10, the average heading angle for the given time steps may be calculated.

The gyroscope refers to one or more sensors configured to detect a turn based on an angular velocity. Output of the gyroscope may be stored for each time step in which a corresponding image-based reference position is measured and an average heading variance for the given time steps may be calculated based on the stored output. The navigation apparatus may compare the average heading variance calculated based on image-based reference positions and the average heading variance calculated based on the output of the gyroscope. If a difference therebetween is greater than a threshold, the navigation apparatus may classify a corresponding image-based reference position, for example, an image-based reference position of a most recent time step, as a fault.

Figure 11:
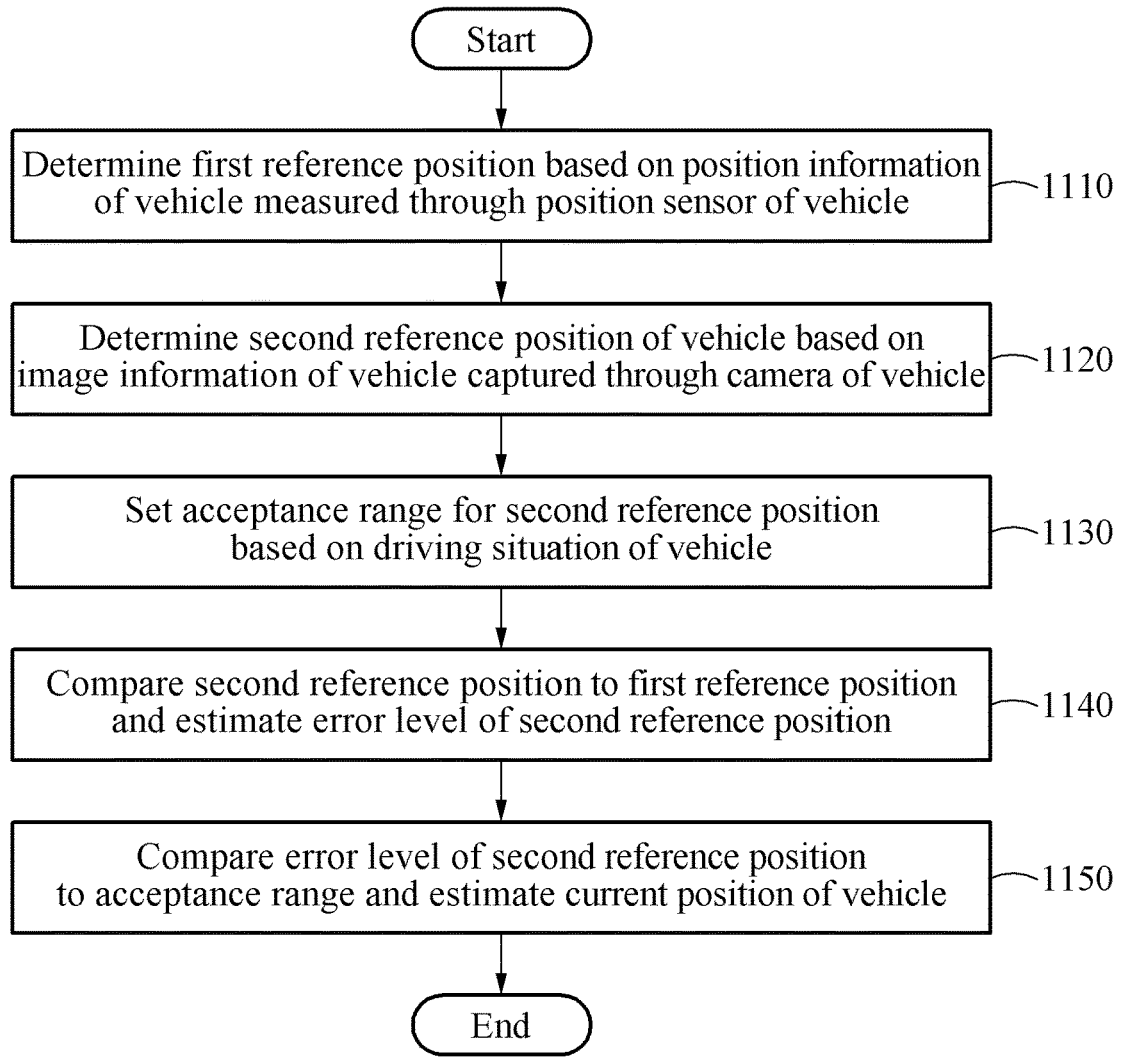
FIG. 11 is a flowchart illustrating an example of a method with vehicle localization.

FIG. 11 is a flowchart illustrating an example of a method with vehicle localization. Referring to FIG. 11, the navigation apparatus may determine a first reference position based on position information of a vehicle measured through a position sensor of the vehicle in operation 1110, determine a second reference position of the vehicle based on image information of the vehicle captured through a camera of the vehicle in operation 1120, set an acceptance range for the second reference position based on a driving situation of the vehicle in operation 1130, compare the second reference position to the first reference position and estimate an error level of the second reference position in operation 1140, and compare the error level of the second reference position to the acceptance range and estimate a current position of the vehicle in operation 1150. Description made above with reference to FIGS. 1 to 10 and the below FIG. 12 and FIG. 13 may apply to the method with vehicle localization.

Figure 12:
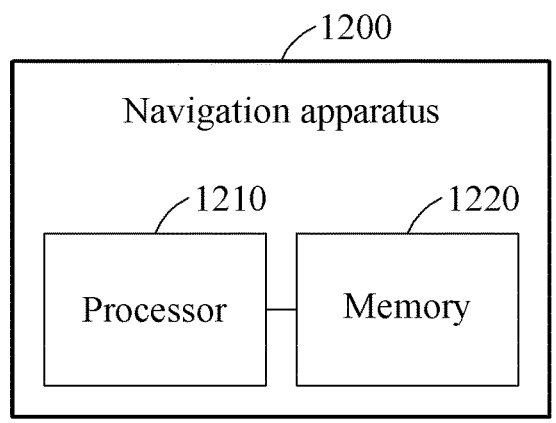
FIG. 12 illustrates an example of a configuration of a navigation apparatus.

FIG. 12 is a diagram illustrating an example of a configuration of a navigation apparatus. Referring to FIG. 12, a navigation apparatus 1200 may include a processor 1210 and a memory 1220. The navigation apparatus may be a vehicle, a control system or apparatus, or may be another electronic device. The memory 1220 may connect to the processor 1210 and may store instructions executable by the processor 1210, data to be operated by the processor 1210, and/or data processed by the processor 1210. The memory 1220 may include various memories, such as including a non-transitory computer-readable medium, for example, a high-speed random access memory and/or a non-volatile computer-readable storage medium, such as, for example, at least one disk storage device, flash memory device, and other non-volatile solid state memory devices, as non-limiting examples.

The processor 1210 may execute instructions, which when executed cause the processor to implement one or more or all operations, processes, and/or methods, in all various combinations thereof, described herein with respect to FIGS. 1 to 11 and FIG. 13. For example, the processor 1210 may determine a first reference position based on position information of a vehicle measured through a position sensor of the vehicle, determine a second reference position of the vehicle based on image information of the vehicle captured through a camera of the vehicle, set an acceptance range for the second reference position based on a driving situation of the vehicle, compare the second reference position to the first reference position and estimate an error level of the second reference position, and compare the error level of the second reference position to the acceptance range and estimate a current position of the vehicle. Again, descriptions made above with reference to FIGS. 1 to 11 and below with reference to FIG. 13 may apply to the navigation apparatus 1200.

Figure 13:
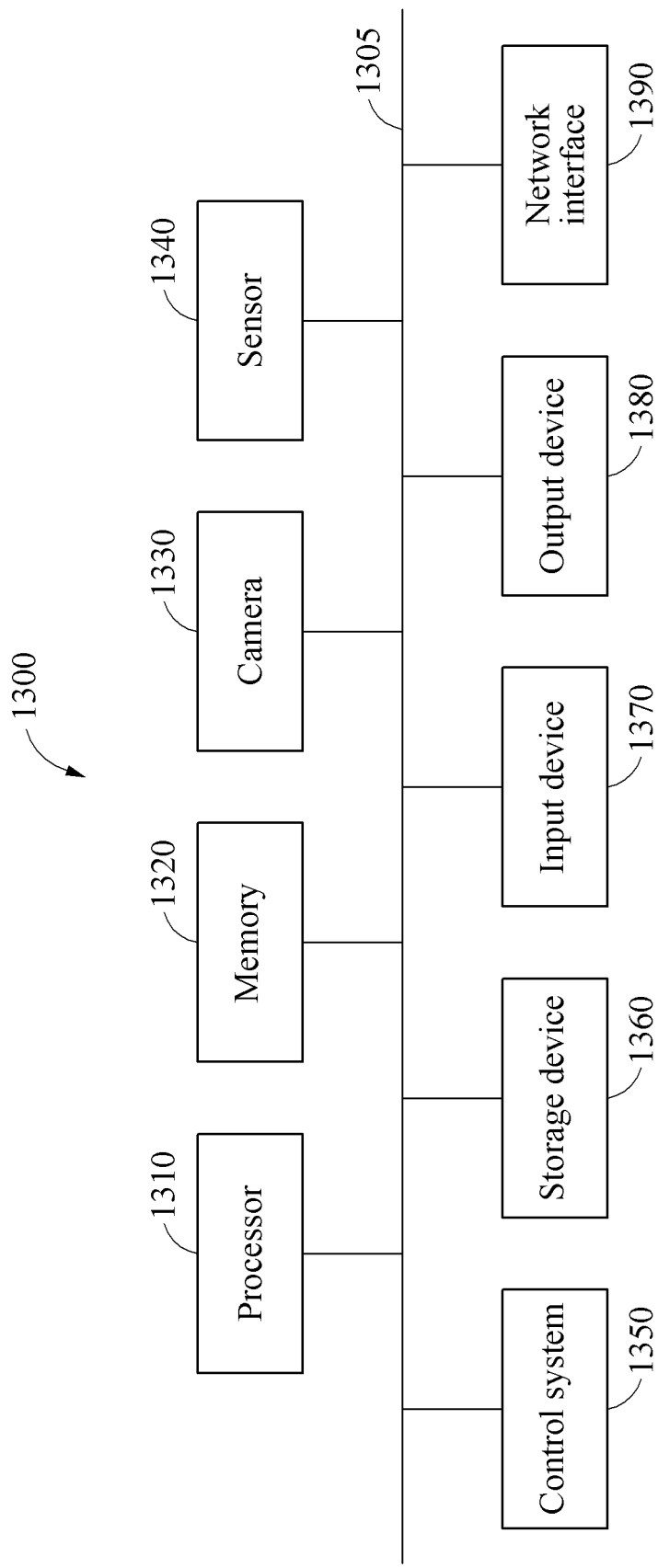
FIG. 13 illustrates an example of a configuration of an electronic device.

FIG. 13 is a diagram illustrating an example of a configuration of an electronic device. Referring to FIG. 13, an electronic device 1300 may include a processor 1310, a memory 1320, a camera 1330, a sensor 1340, a control system 1350, a storage device 1360, an input device 1370, an output device 1380, and a network interface 1390. The components of the electronic device 1300 may communicate with each other through a communication bus 1305.

In addition, while singular references are made to the processor 1310, the memory 1320, the camera 1330, the sensor 1340, the control system 1350, the storage device 1360, the input device 1370, the output device 1380, the network interface 1390, and the communication bus 1305, examples also include respective examples where there are plural or singular, in all various combinations, of each of the processor 1310, the memory 1320, the camera 1330, the sensor 1340, the control system 1350, the storage device 1360, the input device 1370, the output device 1380, the network interface 1390, and the communication bus 1305, such as in the example where in the electronic device is a vehicle. As another example, the electronic device 1300 may correspond to a vehicle control device, apparatus, or system and may perform various vehicle-related operations, for example, a driving function control and an additional function control. Additionally, the electronic device 1300 may structurally and/or functionally include the navigation apparatus 100 of FIG. 1 and may be implemented as the vehicle, e.g., an autonomous vehicle, with all remaining components of the vehicle, or a part of the vehicle, all as non-limiting examples.

The electronic device 1300 may estimate a position of the vehicle through sensor-based localization and image-based localization and may perform subsequent operations based on the estimated position, such as the driving function control in the autonomous vehicle.

The processor 1310 may execute functions and instructions to be executed in the electronic device 1300. For example, the processor 1310 may process instructions stored in the memory 1320 and/or the storage device 1360. In an example, the processor 1310 and the memory 1320 may correspond to the processor 1210 and the memory 1220 of FIG. 1200. In one example, the processor 1310 may estimate a position of the vehicle through the sensor-based localization and/or the image-based localization and may generate a control instruction associated with driving of the vehicle based on the estimated position. The processor 1310 is configured to perform one or more or all operations, processes, and/or methods described above with reference to FIGS. 1 to 12.

The memory 1320 may store data for vehicle localization. The memory 1320 may include a computer-readable storage medium and/or a computer-readable storage device. The memory 1320 may store instructions to be executed by the processor 1310 and may store related information during execution of additional software and/or applications by the electronic device 1300.

The camera 1330 may capture a video image and/or still images, for example, photos. For example, the camera 1330 may include one or more cameras 1330 of the vehicle and may capture respective surroundings of the vehicle in a predetermined directions, such as, front, rear, upward, and/or downward, of the vehicle and may generate respective image information related to the surroundings of the vehicle. In one example, the camera 1330 may provide a 3D image that includes depth information of objects.

The sensor 1340 may sense information, such as, sight, hearing, and touch, associated with the electronic device 1300. For example, the sensor 1340 may include a position sensor, an ultrasound sensor, a radar sensor, and a light detection and ranging (LiDAR) sensor. The control system 1350 may control the vehicle in response to a control instruction of the processor 1310. For example, the control system 1350 may physically control various functions related to the vehicle, including driving functions such as acceleration, steering, and braking of the vehicle, and additional functions such as opening and closing a door, opening and closing a window, and activating an airbag.

The storage device 1360 may include a computer-readable storage medium and/or a computer-readable storage device. In one example, the storage device 1360 may store a larger amount of information than the memory 1320 and may store the information for a long term. For example, the storage device 1360 may include a magnetic hard disk, an optical disc, a flash memory, a floppy disk, or other types of non-volatile memory, as non-limiting examples. Either or both of the storage device 1360 and the memory 1320 may store the HD map.

The input device 1370 may receive an input from a user through a typical input scheme using a keyboard and a mouse and a new input scheme such as a touch input, a voice input, an image input. For example, the input device 1370 may include another device capable of detecting an input from a keyboard, a touchscreen, a microphone, or a user, steering wheel or other vehicle interior inputs, and transferring the detected input to the electronic device 1300.

The output device 1380 may provide an output of the electronic device 1300 to the user through a visual, auditory, or tactile channel. For example, the output device 1380 may include, for example, a display, a touchscreen, a speaker, a vibration generator, or other devices capable of providing the output to the user. The network interface 1390 may communicate with an external device over a wired or wireless network. The output device may also provide augmented reality information to the user, e.g., overlaid with views by the user through the windshield of the vehicle, regarding the driving progression, including estimated positions and/or final positions of the vehicle.

The apparatuses, navigation apparatuses, processors, memories, image sensors, cameras, 3D cameras, depth sensors, position sensors, GPS sensors, gyroscopes, other sensors, control systems, storage devices, input devices, output devices, network interfaces, communication busses, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
    setting, based on a sensor-based determination of a currently performed driving situation of a vehicle, a current acceptance range for a second reference position generated in the driving situation by performing image-based localization using image information obtained using a camera of the vehicle;
    generating a current position of the vehicle by comparing an error level of the second reference position to the acceptance range in the driving situation, where the error level is estimated by comparing the second reference position to a sensor-based first reference position derived using a position sensor measuring a position of the vehicle in the driving situation; and
    controlling the vehicle based on the current position of the vehicle.

2. The method of claim 1, further comprising performing the generating of the second reference position based on extracted geometric information of a lane boundary included in the image information.

3. The method of claim 1, wherein the second reference position comprises one or both of information on a lane to which the vehicle belongs, and information on a detailed position of the vehicle in the lane to which the vehicle belongs.

4. The method of claim 1, wherein the setting of the acceptance range for the second reference position includes performing the determining of the driving situation from among plural predetermined driving situations, the plural predetermined driving situations including at least one of a first driving situation in which the vehicle drives at an intersection, and a second driving situation in which the vehicle drives by turning a corner.

5. The method of claim 1, wherein the setting of the acceptance range comprises selectively adjusting a width of a previously set acceptance range based on the driving situation.

6. The method of claim 1, wherein the setting of the acceptance range comprises setting an acceptance range for a second driving situation, in which the vehicle drives by turning a corner, to be wider than an acceptance range set for a first driving situation in which the vehicle drives at an intersection.

7. The method of claim 1, further comprising performing the generating of the first reference position, wherein the generating of the current position excludes, in response to the error level of the second reference position being outside the acceptance range, consideration of the second reference position in the generating of the current position.

8. The method of claim 1, wherein the generating of the current position comprises:

in response to the error level of the second reference position being outside the acceptance range, selecting the first reference position, as the current position of the vehicle; and in response to the error level of the second reference position being inside the acceptance range, generating a new position, as the current position of the vehicle, based on a weighted sum of the second reference position and the first reference position.

9. The method of claim 1, further comprising performing the comparing of the second reference position to the first reference position, including consideration of a distance between the second reference position and the first reference position.

10. The method of claim 1, further comprising setting another acceptance range for another second reference position in a subsequent time step, including setting a width of the other acceptance range to be wider than a width of the acceptance range when the second reference position is outside of the acceptance range.

11. The method of claim 1, further comprising:
detecting a change in a reference heading angle corresponding to the second reference position with respect to respective heading angles corresponding to plural second reference positions generated at respective times previous to a current time when the second reference position is generated,
wherein the generating of the current position comprises generating the current position of the vehicle by further considering a comparison result between an output of a gyroscope and the determined change in the reference heading angle.

12. A non-transitory computer-readable record medium storing instructions that, when executed by a processor, cause the processor to perform the method of claim 1.

13. An apparatus comprising:
one or more processors configured to:
set, based on a sensor-based determination of a currently performed driving situation of a vehicle, a current acceptance range for a second reference position generated in the driving situation by performing image-based localization using image information obtained using a camera of the vehicle;
generate a current position of the vehicle by comparing an error level of the second reference position to the calculated acceptance range in the driving situation, where the error level is estimated by comparing the second reference position to a sensor-based first reference position derived using a position sensor measuring a position of the vehicle in the driving situation;
control the vehicle based on the current position of the vehicle.

14. The apparatus of claim 13, wherein the processor is configured to perform the comparison of the second reference position to the first reference position, including consideration of a distance between the second reference position and the first reference position.

15. The apparatus of claim 13, wherein the processor is further configured to perform the generation of the current position of the vehicle, including the processor being configured to:
select the first reference position, as the current position of the vehicle, in response to the error level of the second reference position being outside the acceptance range; and generate a new position, as the current position of the vehicle, based on a weighted sum of the second reference position and the first reference position in response to the error level of the second reference position being within the acceptance range.

16. The apparatus of claim 15, wherein the apparatus is the vehicle further comprising the camera, the sensor, and a control system configured to perform the control the vehicle based on the current position.

17. The apparatus of claim 13, wherein, for the setting of the acceptance range, the processor is configured to set an acceptance range for a second driving situation, in which the vehicle drives by turning a corner, to be wider than an acceptance range set for a first driving situation in which the vehicle drives at an intersection.

18. The apparatus of claim 13, wherein the processor is further configured to set another acceptance range for another second reference position in a subsequent time step, including setting a width of the other acceptance range to be wider than a width of the acceptance range when the second reference position is outside of the acceptance range.

19. The apparatus of claim 13, further comprising a memory storing instructions, which when executed by the processor, configure the processor to perform the determining of the first reference position, the determining of the second reference position, the setting of the acceptance range, the comparing of the second reference position to the first reference position and estimate the error level, the comparing of the error level of the second reference position to the acceptance range, and the estimating of the current position.

20. An apparatus comprising:
a processor configured to:
determine a first reference position based on position information of a vehicle measured using a position sensor of the vehicle;
determine a second reference position of the vehicle based on image information of the vehicle captured using a camera of the vehicle;
set an acceptance range for the second reference position based on a driving situation of the vehicle;
compare the second reference position to the first reference position and estimate an error level of the second reference position;
compare the error level of the second reference position to the acceptance range and estimate a current position of the vehicle; and
generate a control instruction associated with driving of the vehicle based on the current position of the vehicle; and
a control system configured to control the vehicle in response to the control instruction.

21. The apparatus of claim 20, wherein the apparatus is a vehicle and further comprises the camera.

22. The apparatus of claim 20, wherein, for the estimation of the error level of the second reference position, the processor is configured to determine the error level based on a distance between the second reference position and the first reference position.

23. The apparatus of claim 20, wherein, for the estimation of the current position of the vehicle, the processor is configured to:
estimate the first reference position as the current position of the vehicle in response to the error level of the second reference position being outside the acceptance range; and estimate a new position estimated based on a weighted sum of the second reference position and the first reference position as the current position of the vehicle in response to the error level of the second reference position being inside the acceptance range.

24. A processor-implemented method performed by a vehicle, the method comprising:

in a currently performed driving situation of the vehicle based on current road and/or vehicle direction information:

determining a first reference position based on position information of the vehicle measured using a position sensor of the vehicle;

determining a second reference position of the vehicle based on image information of the vehicle captured using a camera of the vehicle;

selecting, based on a determination of whether the second reference position is a faulty position, between estimating a current position of the vehicle based on the first reference position and the second reference position, and estimating the current position of the vehicle based on the first reference position;

estimating the current position based on a result of the selecting;

displaying, using a display of the vehicle, virtual navigation information that is dependent on the estimated current position; and controlling the vehicle based on the current position of the vehicle, wherein the determination of whether the second reference position is the faulty position is based on an acceptance range that is dependent on a determination, in the currently performed driving situation, of the currently performed driving situation, and based on whether an estimated error of the second reference position is within the acceptance range.

25. The method of claim 24, wherein the acceptance range is set differently for at least two different driving situations, including the acceptance range being set to be wider in a turn corner situation than in an intersection situation.

26. The method of claim 24, wherein the determination of whether the second reference position is the faulty position further includes consideration of at least one or both of whether a previous time step determined second reference position was determined to be faulty, and a comparison between a determined change in reference heading angle corresponding to the second reference position and an output of a gyroscope of the vehicle.

27. A processor-implemented method of a vehicle, the method comprising:

estimating a first reference position by performing a sensor-based localization operation using one or more position sensors of the vehicle that measure respective positional information of the vehicle in a sensor-based determined current driving situation of the vehicle;

estimating, in the driving situation, a second reference position by performing an image-based localization operation based on image information of the vehicle derived using a camera of the vehicle;

generating, in a current time step, a final position of the vehicle by updating a final position of the vehicle in a previous time step based on the estimated first reference position, and based on, when an estimated error of the estimated second reference position is within an acceptance range that is variably dependent on the driving situation, a correcting of the estimated first reference position based on the estimated second reference position; and controlling the vehicle based on the final position of the vehicle.

28. The method of claim 27, further comprising displaying, using a display of the vehicle, virtual navigation information that is dependent on the generated final position of the vehicle.

* * * * *